United States Patent
Sanders et al.

(10) Patent No.: US 9,060,337 B2
(45) Date of Patent: Jun. 16, 2015

(54) METHODS AND SYSTEMS FOR PRESERVING THE LIFE OF A POWER SOURCE OF A WIRELESS END NODE IN A TRANSPORT REFRIGERATION SYSTEM

(71) Applicants: THERMO KING CORPORATION, Minneapolis, MN (US); ROBERTSHAW CONTROLS COMPANY, Carol Stream, IL (US)

(72) Inventors: Russell Lee Sanders, Minnetonka, MN (US); Mark Daniel Leasure, Eagan, MN (US); Kim Vitkus, Sycamore, IL (US); Mark Johnson, Wheaton, IL (US); Steve Pasek, Bartlett, IL (US)

(73) Assignees: THERMO KING CORPORATION, Minneapolis, MN (US); INVENSYS SYSTEMS, INC., Foxboro, MA (US)

( * ) Notice: Subject to any disclaimer, the term of this patent is extended or adjusted under 35 U.S.C. 154(b) by 100 days.

(21) Appl. No.: 13/848,468

(22) Filed: Mar. 21, 2013

(65) Prior Publication Data
US 2013/0279386 A1 Oct. 24, 2013

Related U.S. Application Data

(60) Provisional application No. 61/613,944, filed on Mar. 21, 2012, provisional application No. 61/787,691, filed on Mar. 15, 2013, provisional application No. 61/613,956, filed on Mar. 21, 2012, provisional (Continued)

(51) Int. Cl.
*H04W 52/02* (2009.01)
*F25B 49/00* (2006.01)

(Continued)

(52) U.S. Cl.
CPC ........... *H04W 52/0261* (2013.01); *F25B 49/00* (2013.01); *H04W 52/02* (2013.01);

(Continued)

(58) Field of Classification Search
None
See application file for complete search history.

(56) References Cited

U.S. PATENT DOCUMENTS

| | | | |
|---|---|---|---|
| 5,361,985 A | 11/1994 | Rein et al. | |
| 5,557,096 A | 9/1996 | Watanabe et al. | |

(Continued)

FOREIGN PATENT DOCUMENTS

| | | |
|---|---|---|
| JP | 09-126902 | 5/1997 |
| JP | 09-196768 | 7/1997 |

(Continued)

OTHER PUBLICATIONS

International Search Report for PCT/US2013/033300 dated Apr. 30, 2013, 3 pages.

(Continued)

*Primary Examiner* — Kerri Rose
(74) *Attorney, Agent, or Firm* — Hamre, Schumann, Mueller & Larson, P.C.

(57) ABSTRACT

Methods and systems for preserving the life of a power source of a wireless end node of a wireless communication system for use in a mobile environment are provided. In one embodiment, a method is provided that includes wirelessly transmitting a wireless end node acknowledgment message to a network coordinator during a normal operation mode of the wireless end node. The method also includes the wireless end node monitoring for a network coordinator acknowledgment message from a network coordinator in response to the wireless end node acknowledgement message during the normal operation mode of the wireless end node. Also, the method includes incrementing a missed acknowledgment counter value stored in a memory storage of the wireless end node when the network coordinator acknowledgment message is not received. Further, the method includes increasing a time period of a sleep timer of the wireless end node when the missed acknowledgment counter value equals a missed acknowledgment threshold.

12 Claims, 4 Drawing Sheets

Related U.S. Application Data application No. 61/613,949, filed on Mar. 21, 2012, provisional application No. 61/613,952, filed on Mar. 21, 2012, provisional application No. 61/787,719, filed on Mar. 15, 2013, provisional application No. 61/613,946, filed on Mar. 21, 2012.

(51) Int. Cl.
*B60R 16/03* (2006.01)
*H02J 4/00* (2006.01)
*G08C 17/02* (2006.01)
*F25D 29/00* (2006.01)
*B60H 1/00* (2006.01)

(52) U.S. Cl.
CPC ............... *B60R 16/03* (2013.01); *H02J 4/00* (2013.01); *G08C 17/02* (2013.01); *F25D 29/003* (2013.01); *F25B 2600/07* (2013.01); *B60H 1/00* (2013.01); *B60H 1/00014* (2013.01)

(56) References Cited

U.S. PATENT DOCUMENTS

| | | | |
|---|---|---|---|
| 5,720,171 | A | 2/1998 | Osterhoff et al. |
| 5,907,491 | A | 5/1999 | Canada et al. |
| 6,467,694 | B1 | 10/2002 | Jerome |
| 6,553,336 | B1 | 4/2003 | Johnson et al. |
| 6,593,845 | B1 * | 7/2003 | Friedman et al. .......... 340/10.33 |
| 6,693,511 | B1 | 2/2004 | Seal |
| 6,721,546 | B1 | 4/2004 | Compton |
| 6,744,352 | B2 | 6/2004 | Lesesky et al. |
| 6,863,222 | B2 | 3/2005 | Slifkin et al. |
| 6,917,857 | B2 | 7/2005 | Rentmeester et al. |
| 6,922,558 | B2 | 7/2005 | Delp et al. |
| 7,026,929 | B1 | 4/2006 | Wallace |
| 7,260,732 | B1 | 8/2007 | Bittner, Jr. |
| 7,612,652 | B2 * | 11/2009 | Stewart et al. ............. 340/10.34 |
| 7,647,078 | B2 | 1/2010 | Kim et al. |
| 7,743,616 | B2 | 6/2010 | Renken et al. |
| 7,784,707 | B2 | 8/2010 | Witty et al. |
| 7,831,282 | B2 * | 11/2010 | Luebke et al. ................ 455/574 |
| 7,878,008 | B1 | 2/2011 | Mateski et al. |
| 7,903,494 | B2 | 3/2011 | Battista |
| 7,940,716 | B2 | 5/2011 | Twitchell, Jr. |
| 7,952,485 | B2 | 5/2011 | Schechter et al. |
| 7,969,912 | B2 * | 6/2011 | Jeon et al. ..................... 370/254 |
| 7,992,421 | B2 | 8/2011 | Jeftic-Stojanovski et al. |
| 7,995,339 | B2 | 8/2011 | Bash et al. |
| 8,035,508 | B2 | 10/2011 | Breed |
| 8,047,432 | B2 | 11/2011 | Breed |
| 8,115,620 | B2 | 2/2012 | Breed |
| 8,248,252 | B2 | 8/2012 | Schechter et al. |
| 8,269,627 | B2 | 9/2012 | Gore et al. |
| 8,307,667 | B2 | 11/2012 | Rusignuolo et al. |
| 8,619,653 | B2 * | 12/2013 | Ji et al. .......................... 370/311 |
| 2002/0187025 | A1 | 12/2002 | Speasl et al. |
| 2005/0232747 | A1 | 10/2005 | Brackmann et al. |
| 2006/0202859 | A1 | 9/2006 | Mastrototaro et al. |
| 2006/0279424 | A1 | 12/2006 | Yoong |
| 2007/0193289 | A1 | 8/2007 | Matsui et al. |
| 2007/0267509 | A1 | 11/2007 | Witty et al. |
| 2008/0077260 | A1 | 3/2008 | Porter et al. |
| 2008/0252469 | A1 | 10/2008 | Perten et al. |
| 2009/0015400 | A1 | 1/2009 | Breed |
| 2009/0037142 | A1 | 2/2009 | Kates |
| 2009/0058593 | A1 | 3/2009 | Breed |
| 2009/0061897 | A1 | 3/2009 | Hamilton et al. |
| 2009/0135000 | A1 | 5/2009 | Twitchell, Jr. |
| 2009/0139246 | A1 | 6/2009 | Lifson et al. |
| 2009/0140858 | A1 | 6/2009 | Gore et al. |
| 2009/0143923 | A1 | 6/2009 | Breed |
| 2009/0216497 | A1 | 8/2009 | Schwiers et al. |
| 2009/0237258 | A1 | 9/2009 | Heck et al. |
| 2009/0272132 | A1 | 11/2009 | Rusignuolo et al. |
| 2010/0102136 | A1 | 4/2010 | Hadzidedic et al. |
| 2010/0127881 | A1 | 5/2010 | Schechter et al. |
| 2010/0176170 | A1 | 7/2010 | O'Hare |
| 2010/0250009 | A1 | 9/2010 | Lifson et al. |
| 2010/0274604 | A1 | 10/2010 | Crilly |
| 2010/0305794 | A1 | 12/2010 | Foster |
| 2011/0012731 | A1 | 1/2011 | Stevens |
| 2011/0059779 | A1 * | 3/2011 | Thomas et al. ............... 455/574 |
| 2011/0185749 | A1 | 8/2011 | Metzger |
| 2011/0193710 | A1 | 8/2011 | McIlvain et al. |
| 2012/0026016 | A1 | 2/2012 | Mitchell et al. |
| 2012/0028680 | A1 | 2/2012 | Breed |
| 2013/0147624 | A1 * | 6/2013 | Fragnito et al. .............. 340/540 |

FOREIGN PATENT DOCUMENTS

| | | | |
|---|---|---|---|
| JP | 10013338 A * | 1/1998 | ............... H04B 7/26 |
| JP | 2001-324253 | 11/2001 | |
| JP | 2003-214747 | 7/2003 | |
| JP | 2005-234815 | 9/2005 | |
| JP | 2007-228373 | 9/2007 | |
| JP | 2008-185241 | 8/2008 | |
| WO | 2005/043446 | 5/2005 | |
| WO | 2008/153518 | 12/2008 | |

OTHER PUBLICATIONS

Written Opinion for PCT/US2013/033300 dated Apr. 29, 2013, 3 pages.
CargoLink Wireless Sensors, Wireless Sensor System Saves Money, Reduces Maintenance and Offers Increased Load Protection, Thermo King Corporation, Copyright 2011, 4 pages.
Installation Manual, Truck and Trailer Edition, WPAN Installation Manual, Thermo King Corporation, Copyright 2012, 28 pages.
Transport Wireless Technologies Inc., www.transportwireless.com, Copyright 2013, Last accessed Mar. 2012, 1 page.
TRMS-200, Transport Refrigeration Wireless Sensors, Door Switch Sensoers and Fuel Level Sensor, Transport Refrigeration Wireless Technologies, 2 pages.

* cited by examiner

METHODS AND SYSTEMS FOR PRESERVING THE LIFE OF A POWER SOURCE OF A WIRELESS END NODE IN A TRANSPORT REFRIGERATION SYSTEM

FIELD

The embodiments disclosed herein relate generally to a transport refrigeration system. More particularly, the embodiments relate to preserving the life of a power source of a wireless end node of a wireless communication system for use in a mobile environment, such as a transport refrigeration system.

BACKGROUND

Existing transport refrigeration systems are used to cool containers, trailers, and other similar transport units (typically referred to as a "reefer"). Modern reefers may be efficiently stacked for shipment by ship or rail. Typically, when reefers are shipped by truck, a single reefer is placed on a trailer chassis. When cargo in the container includes perishable products (e.g., food product, flowers, etc.), the temperature of the reefer must be controlled to reduce loss of the cargo during shipment.

SUMMARY

The embodiments described herein are directed to preserving the life of a power source of a wireless end node of a wireless communication system for use in a mobile environment, such as a transport refrigeration system.

In one embodiment, a method for preserving the life of a power source of a wireless end node of a wireless communication system for use in a mobile environment is provided. The method includes wirelessly transmitting a wireless end node acknowledgment message to a network coordinator during a normal operation mode of the wireless end node. The method also includes the wireless end node monitoring for a network coordinator acknowledgment message from a network coordinator in response to the wireless end node acknowledgement message during the normal operation mode of the wireless end node. Also, the method includes incrementing a missed acknowledgment counter value stored in a memory storage of the wireless end node when the network coordinator acknowledgment message is not received. Further, the method includes increasing a time period of a sleep timer of the wireless end node when the missed acknowledgment counter value equals a missed acknowledgment threshold in order to reduce current being drawn from a power source of the wireless end node.

In another embodiment, a wireless communication system for use in a mobile environment is provided. The system includes one or more wireless end nodes and a network coordinator. The one or more wireless end nodes is configured to monitor a property of a transport refrigeration system and transmit data transmissions to and receive data transmissions from the network coordinator. Also, the wireless end node is configured to operate in a normal operation mode and a sleep mode. The network coordinator is configured to manage, command, direct and regulate the behavior of the one or more wireless end nodes. During the normal operation mode, the wireless node is configured to increment a missed acknowledgment counter value stored in a memory storage of the wireless end node when a network coordinator acknowledgment message is not received. Also, during the normal operation mode, the wireless end node is configured to increase a time period of a sleep timer of the wireless end node when the missed acknowledgment counter value equals a missed acknowledgment threshold in order to reduce current being drawn from a power source of the wireless end node.

In yet another embodiment a wireless end node of a wireless communication system for use in a mobile environment is provided. The wireless end node includes a power source, a controller, an operating sensor, a transceiver and a memory storage. The controller is configured to manage, command, direct and regulate the behavior of the wireless end node and configured to switch operation of the wireless end node between a normal operation mode and a sleep mode. The controller includes a sleep timer configured to count down a time period that the wireless end node operates in the sleep mode. The operating sensor is configured to monitor a property of a transport refrigeration system. The transceiver is configured to transmit data to and receive data from a network coordinator of a wireless communication system. The memory storage stores a missed acknowledgment threshold and a missed acknowledgment counter value. The controller increments a missed acknowledgment counter value stored in a memory storage of the wireless end node when the transceiver does not receive a network coordinator acknowledgment message in response to a transmitted wireless end node acknowledgement message. The controller is configured to increase the time period of the sleep timer when the missed acknowledgment counter value equals the missed acknowledgment threshold in order to reduce current being drawn from the power source.

BRIEF DESCRIPTION OF THE DRAWINGS

Referring now to the drawings in which like reference numbers represent corresponding parts throughout.

DETAILED DESCRIPTION

The embodiments described herein are directed to preserving the life of a power source of a wireless end node of a wireless communication system for use in a mobile environment, such as a transport refrigeration system.

References are made to the accompanying drawings that form a part hereof, and in which is shown by way of illustration of the embodiments in which the methods and systems described herein may be practiced. The term "reefer" generally refers to, for example, a temperature controlled trailer, container, or other type of transport unit, etc. The term "wireless communication system" refers to a communication system that is configured to transmit data over a short distance in a mobile environment, such as, for example, between different points of a reefer that is in transport. The term "wireless end node" refers to an electronic device that is an endpoint of a wireless communication system and is capable of monitoring a property of a transport refrigeration system and transmitting data transmissions to and receiving data transmissions from a network coordinator of the wireless communication system. The term "network coordinator" refers to an electronic device that is configured to manage, command, direct and regulate the behavior of one or more wireless end nodes of the wireless communication system.

Figure 1:
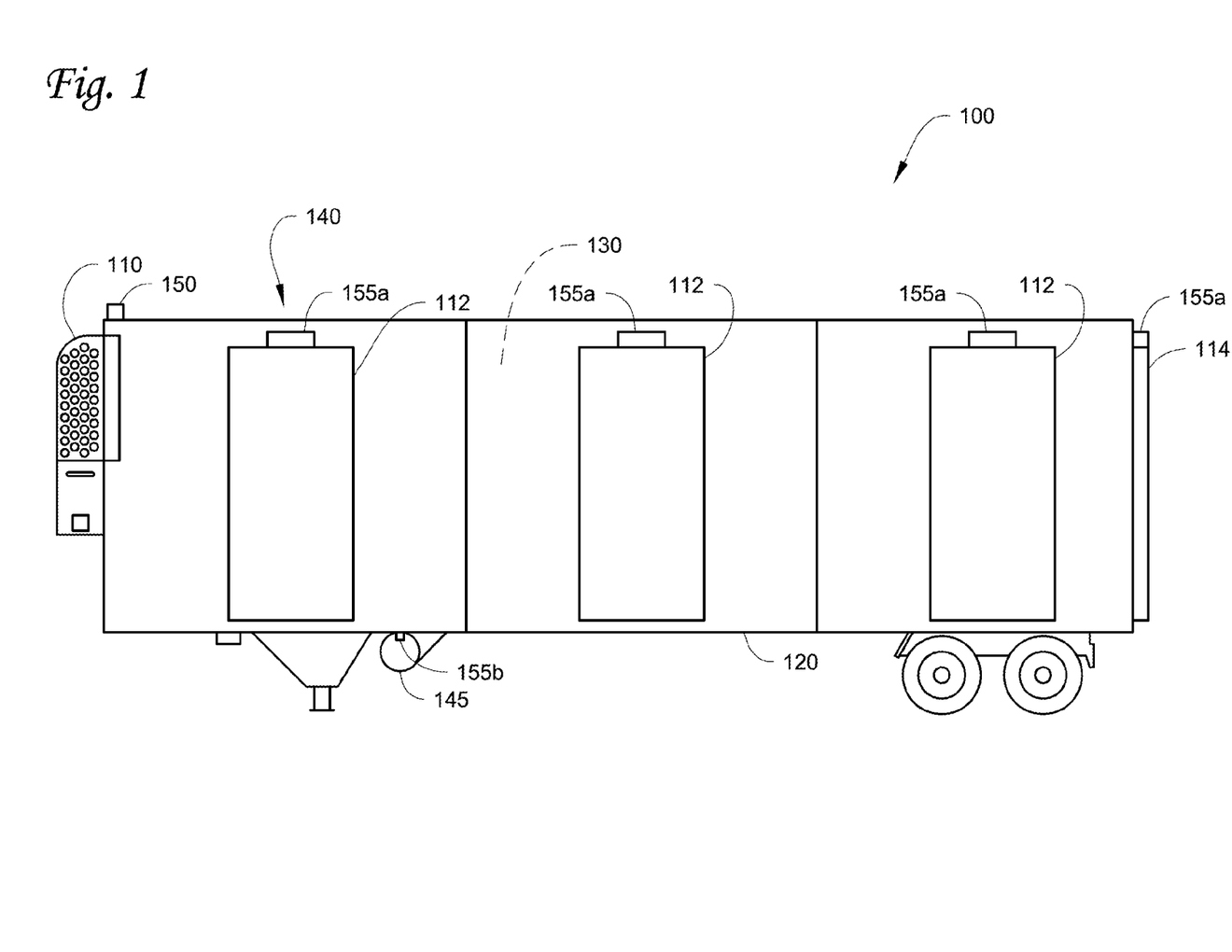
FIG. 1 illustrates a side view of an embodiment of a transport temperature controlled trailer unit with a transport refrigeration system.

FIG. 1 illustrates a side view of a transport temperature controlled trailer unit 100 with a transport refrigeration system 110. The trailer unit 100 is installed on a frame 120 and has a plurality of side doors 112 and a rear door 114. The transport refrigeration system 110 is installed on a side wall of the trailer unit 100. In other embodiments, the transport refrigeration system can be placed at different locations on the trailer unit 100. For example, a generator set of a transport refrigeration system can be mounted under the trailer unit 100 and cold plates of a transport refrigeration system can be mounted on the ceiling of the trailer unit 100. The transport refrigeration system 110 is configured to transfer heat between an internal space 130 and the outside environment.

In some embodiments, the transport refrigeration system 110 is a multizone system in which different zones or areas of the internal space 130 are controlled to meet different refrigeration requirements based on the cargo stored in the particular zone.

It will be appreciated that the embodiments described herein are not limited to trucks and trailer units. The embodiments described herein may be used in any other suitable temperature controlled apparatuses such as a ship board container, an air cargo cabin, an over the road truck cabin, etc. The refrigeration system may be a vapor-compressor type refrigeration system, or any other suitable refrigeration systems that can use refrigerant, cold plate technology, etc.

The transport refrigeration system 110 includes a wireless communication system 140 and a fuel tank 145. The wireless communication system 140 includes a network coordinator (not shown), an antenna 150, and a plurality of wireless end nodes 155. As shown in FIG. 1, the wireless end nodes 155 include a door sensor 155a for each of the side doors 112 and the rear door 114, and a fuel level sensor 155b for the fuel tank 145. In some embodiments, the wireless end nodes 155 can also include other types of sensors such as, for example, an air space temperature sensor, a humidity sensor, a cargo temperature center, etc. Also, the wireless end nodes 155 are sealed to prevent failure due to water ingress, extreme temperatures, UV exposure, exposure to oil/solvents, etc. The wireless communication system 140 is configured to communicate information regarding the transport temperature controlled trailer unit 100 to a controller unit (not shown) of the transport refrigeration system 110 for controlling the refrigeration of the internal space 130.

Figure 2:
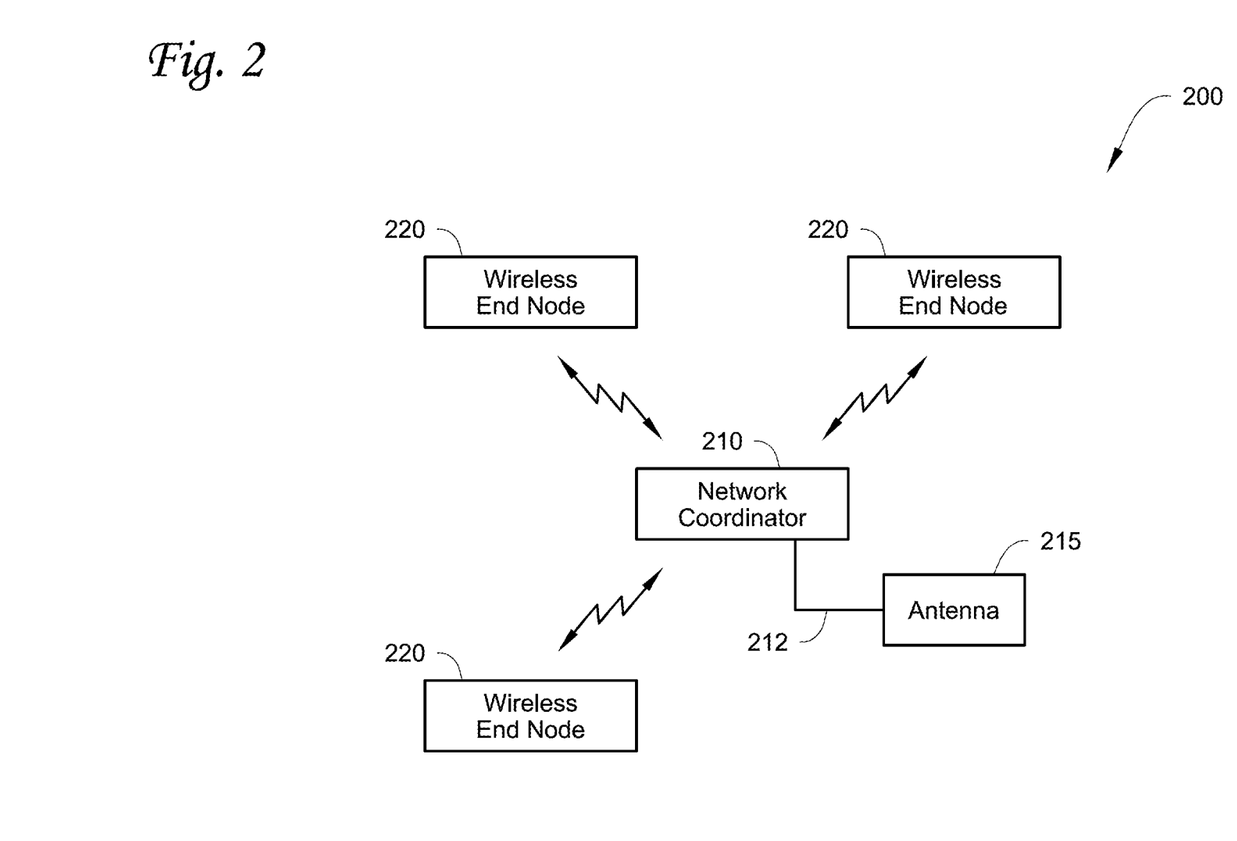
FIG. 2 illustrates a block diagram of an embodiment of a wireless communication system for use in a mobile environment.

Referring to FIG. 2, a block diagram of one embodiment of a wireless communication system 200 for use in a mobile environment is described. The wireless communication system 200 includes a network coordinator 210, an antenna 215 and a plurality of wireless end nodes 220. The wireless communication system 200 can be a wireless personal area network ("WPAN") that uses a ZigBee communication protocol. In other embodiments, other types of communication protocols can be used such as, for example, Bluetooth or any other type of wireless communication protocol that allows for accurate transmission of data between different points of a reefer during transport.

In some embodiments the network coordinator 210 is a WPAN module that is configured to be installed in a control box (not shown) of a transport refrigeration system. The network coordinator 210 is configured to transmit to and receive data from each of the plurality of wireless end nodes 220 via the antenna 215 using a short distance wireless communication protocol such as, for example ZigBee, Bluetooth, etc. Also, the network coordinator 210 is configured to connect to a control unit of a transport refrigeration system stored in the control box.

The antenna 215 is a weatherproof antenna that is configured to be installed outside of the control box and is connected to the network coordinator 210 via a wired communication link 212 such as, for example, a coaxial cable. In some embodiments, the antenna 215 can be configured to be installed inside the control box with the network coordinator 210.

Each of the plurality of wireless end nodes 220 is configured to transmit and receive information with the network coordinator 210 using a short distance wireless communication protocol such as, for example ZigBee, Bluetooth, etc. In some embodiments, one or more of the wireless end nodes 220 are industrialized by using a sealed housing (not shown) to prevent failure due to water ingress, extreme temperatures, UV exposure, exposure to oil/solvents, etc.

Each of the plurality of wireless end nodes 220 can be, for example, a door sensor, a fuel tank level sensor, an air space temperature sensor, a humidity sensor, a cargo temperature center, etc. When the wireless end node 220 is a door sensor, the wireless end node 220 is configured to transmit a data signal to the network coordinator 210 when a door of the transport refrigeration system being monitored by the wireless end node 220 is opened or closed. When the wireless end node 220 is a fuel tank level sensor, the wireless end node 220 is configured to transmit a data signal to the network coordinator 210 indicating the level of a fuel tank of a transport refrigeration system. When the wireless end node 220 is an air space temperature sensor, the wireless end node 220 is configured to transmit a data signal to the network coordinator 210 indicating the temperature of an internal space of a reefer. When the wireless end node 220 is a humidity sensor, the wireless end node 220 is configured to transmit a data signal to the network coordinator 210 indicating the humidity of an internal space of a reefer. When the wireless end node 220 is a cargo temperature sensor, the wireless end node 220 is configured to transmit a data signal to the network coordinator 210 indicating the temperature of cargo stored in the reefer.

Figure 3:
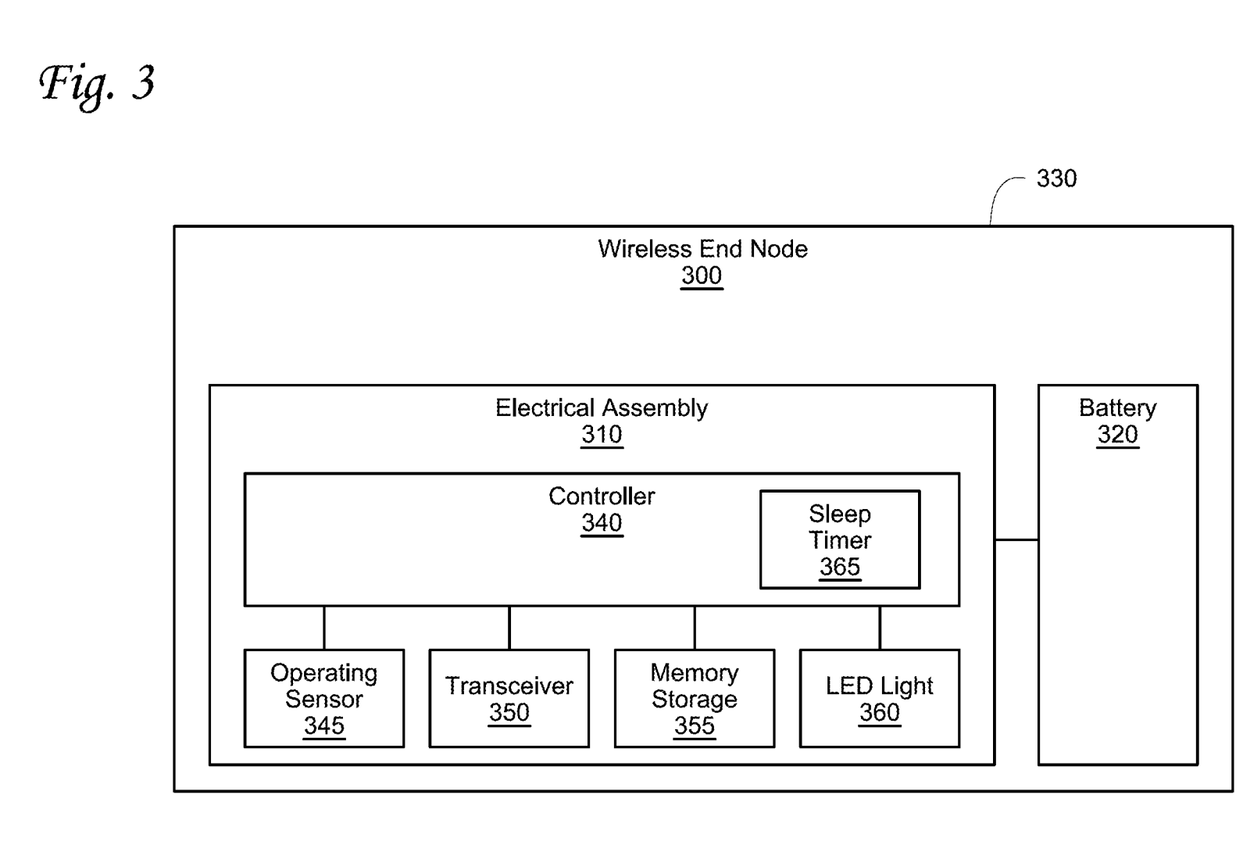
FIG. 3 illustrates a block diagram of an embodiment of a wireless end node of a wireless communication system for use in a mobile environment.

FIG. 3 illustrates one embodiment of a block diagram of a wireless end node 300 for a wireless communication system in a transport refrigeration system of a reefer. The wireless end node 300 can be, for example, a door sensor, a fuel level sensor, an air space temperature sensor, a humidity sensor, a cargo temperature center, etc. The wireless end node 300 includes an electrical assembly 310 and a power source 320 connected to the electrical assembly 310. The electrical assembly 310 and the power source 320 are enclosed within a sealed housing 330.

For transport refrigeration systems, the housing 330 must satisfy vigorous environmental sealing requirements for the wireless end node 300 to be acceptable for use. Accordingly, once the wireless end node is manufactured, the electrical assembly and the power source are not serviceable and any feature within the housing that can penetrate to the outside of the housing could be considered a possible failure point.

The electrical assembly 310 includes a controller 340, an operating sensor 345, a transceiver 350, a memory storage 355, and a light emitting diode (LED) light 360. The controller is provided to control the wireless end node 300 and includes a sleep timer 365.

The controller 340 is configured to manage, command, direct and regulate the behavior of the wireless end node.

Also, the controller 340 is configured to direct the wireless end node 300 to operate in a normal operation mode and a sleep mode. In the normal operation mode, the electrical assembly 310 draws current from the power source 320, the operating sensor 345 can monitor a portion of the transport refrigeration system, the transceiver 350 can transmit data to and receive data from the network coordinator of the wireless communication system. In the sleep mode, the electrical assembly is powered down to reduce the amount of current drawn from the power source. During the sleep mode, sufficient current is drawn from the power source 320 to allow the sleep timer 365 to count down an amount of time to indicate to the controller 340 when the wireless end node 300 should switch to the normal operation mode. Also, sufficient current is drawn from the power source 320 to switch the wireless end node 300 from the sleep mode to the normal operation mode when an interrupt request is received or when the sleep timer indicates to the controller 340 to switch to the normal operation mode.

The operating sensor 345 is connected to the controller 340 and performs a sensing operation for the transport refrigeration system. For example, if the wireless end node 300 is a door sensor, the operation sensor 345 can sense when a door that is being monitored by the wireless end node 300 is opened or closed and can notify the controller 340 of this information. If the wireless end node 300 is a fuel level sensor, the operation sensor 345 can measure the level of a fuel tank of a transport refrigeration system and can notify the controller 340 of this information. If the wireless end node 300 is an air space temperature sensor, the operation sensor 345 can measure the temperature of an internal space of a reefer and can notify the controller 340 of this information. If the wireless end node 300 is a humidity sensor, the operation sensor 345 can measure the humidity of a reefer and can notify the controller 340 of this information. If the wireless end node 300 is a cargo temperature sensor, the operation sensor 345 can measure the temperature of cargo stored in a reefer and can notify the controller 340 of this information.

The transceiver 350 is also connected to the controller 340 and is configured to transmit to and receive data signals from a network coordinator of a wireless communication system. For example, if the wireless end node 300 is a door sensor, the transceiver 350 can receive an acknowledgement message from the network coordinator to indicate that the wireless communication system is for use in a normal operation mode, and can send a sensing message to the network coordinator when the door being monitored by the wireless end node 300 is opened or closed. The transceiver 350 is configured to transmit and receive data using a short distance wireless communication protocol such, for example, ZigBee, Bluetooth, etc.

The memory storage 355 is connected to the controller 340 and can store information such as a missed acknowledgement counter value and a missed acknowledgement threshold. The memory storage 355 can also store information such as, for example, the information provided in the table below:

| Log # | Title | Description |
| --- | --- | --- |
| 1 | Paired Wake Count | The total number of wake up events after pairing. |
| 2 | Unpaired Wake Count | The total number of wake up events before pairing. |
| 3 | Successful Pair | The total number of successful pairings. |
| 4 | Unsuccessful Pair | The total number of unsuccessful pairings |
| 5 | Enter Pair State | The number of times the sensor enters a pairing state. |
| 6 | User Succ. Pair | The user was able to enter a pairing state using the sequence described. |
| 7 | User Unsucc. Pair | The user was unsuccessful in entering a pairing state using the sequence described. |
| 8 | Cross Pair | The number of times two or more network coordinators were paired to the same sensor. |
| 9 | Succ. Unpair | The network coordinator and wireless end node were able to unpair successfully. |
| 10 | Unsucc. Unpair | The network coordinator and wireless end node were not able to unpair successfully. |
| 11 | LQI Value < 5 | Link Quality Indicator is low. |
| 12 | LQI Value < 10 | As above |
| 13 | LQI Value < 15 | As above |
| 14 | Door Open Ev. | The wireless end node detected a fully filtered open door event. |
| 15 | Door Close Ev. | The wireless end node detected a fully filtered closed door event. |
| 16 | Door Ajar Ev. | The wireless end node detected 20 door open/closed transitions in a 5 minute period. |
| 17 | Recov. Door Ajar Ev. | The wireless end node polled the door input 4 times every 5 minutes and did not notice a change in the door state. |
| 18 | Battery Low Ev. | The wireless end node detected a low battery 2.2 V |
| 19 | AD Short Ev. | The A/D wireless end node value exceeded the maximum allowable A/D value. |
| 20 | AD Open Ev. | The A/D wireless end node value was below the minimum allowable A/D value. |
| 21 | 32k Hz Osc Failed Event | The wireless end node failed to transition properly from the 2k oscillator to the 32k crystal. |
| 22 | Lost Comm. 1 | Lost communication with wireless end node ID 1 for five or more consecutive transmissions. |
| 23 | Lost Comm 2 | Lost communication with wireless end node ID 2 for five or more consecutive transmissions. |
| 24 | Lost Comm 3 | Lost communication with wireless end node ID 3 for five or more consecutive transmissions. |
| 25 | Lost Comm 4 | Lost communication with wireless end node ID 4 for five or more consecutive transmissions. |
| 26 | Lost Comm 5 | Lost communication with wireless end node ID 5 for five or more consecutive transmissions. |

-continued

| Log # | Title | Description |
|---|---|---|
| 27 | Dial Back Event | The wireless end node has lost communication with the network coordinator and reduces the transmit time interval |
| 28 | Dial Back Transmission Event | The number of times the wireless end node transmits to the network coordinator while in dial back mode. |
| 29 | PLL Unlock Event | The number of times the wireless end node does not 'lock in' to the proper frequency. |
| 30 | Wake on Error | The number of times the wireless end node awakes to flash an error code. |
| 31 | Wake on A/D Ev. | The number of times the wireless end node awakes to read the A/D sensor. |
| 32 | Wake to Trans. Ev. | The number of times the wireless end node awakes to transmit a message to the network coordinator. |
| 33 | Sleep Ev. | The number of times the wireless end node returns to a sleep state. |
| 34 | Door Open Int. Ev. | The number of times the wireless end node detects a door open interrupt (not necessarily debounced). |
| 35 | Door Close Int. Ev. | The number of times the wireless end node detects a door closed interrupt (not necessarily debounced). |
| 36 | Wake on Timer Ev. | The number of times the wireless end node awakes from the timeout timer. |
| 37 | Wake on Temp Change | The number of times the wireless end node transmits a change of temperature greater than 5 degrees Celsius. |
| 38 | Wake on Power up | The number of times the wireless end node wakes from either a power cycle or a low on the reset line. |

The LED light 360 is connected to the controller 340 and is visible outside of the sealed housing 330. The LED light can be a multi-colored and blinking LED light that is visible to a user of a transport refrigeration system and can be used for pairing the wireless end node 300 to a wireless communication system and for communicating diagnostic information about the wireless end node 300.

The power source 320 can be a native 3.6 volt Li—SOCl2 battery. In other embodiments, the power source 320 can be a lithium based battery (e.g. a lithiumion battery, a lithium/Iron Disulfide (LiFeS2) battery, etc.).

Figure 4:
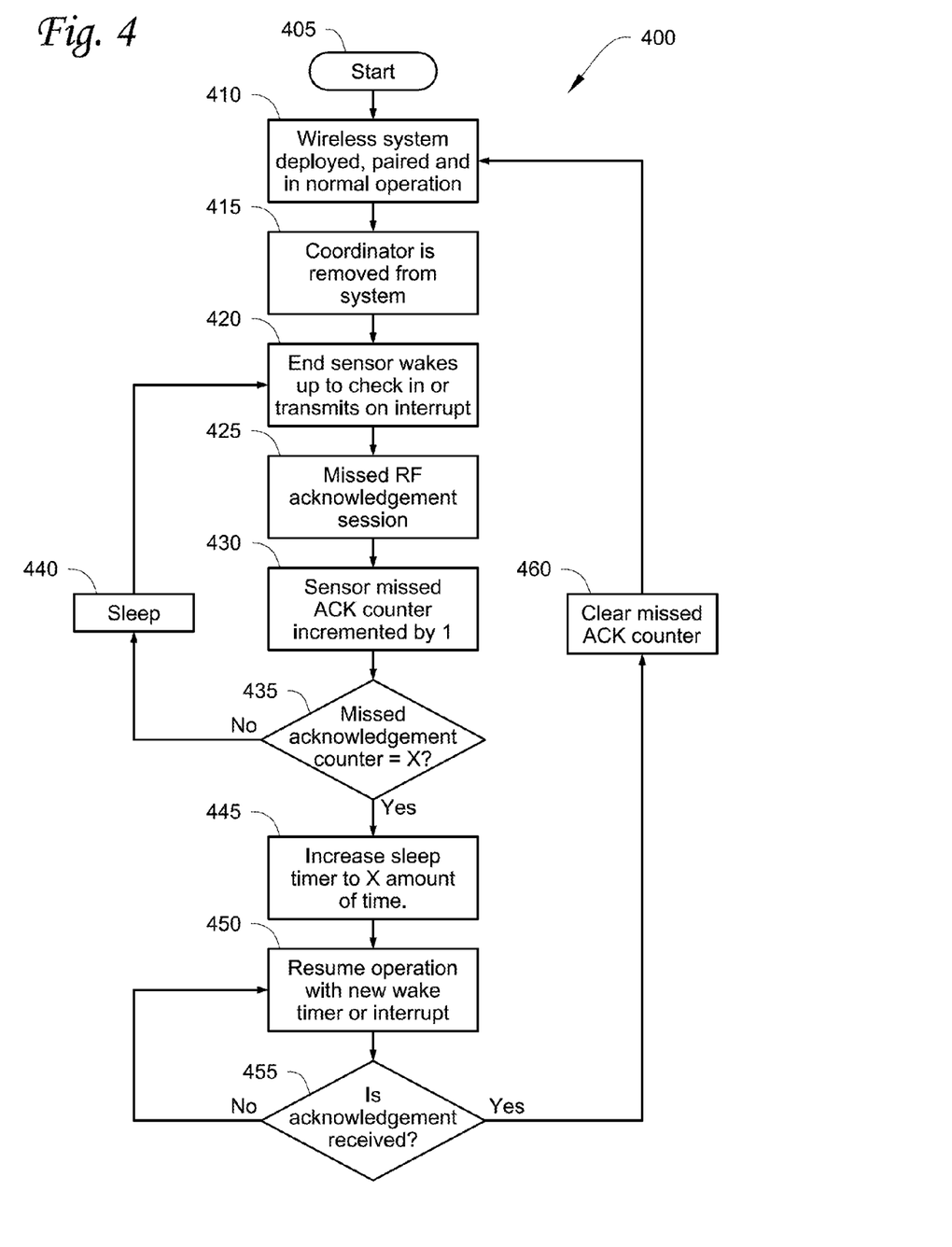
FIG. 4 illustrates a flow chart of an embodiment of preserving the life of a power source of a wireless end node of a wireless communication system for use in a mobile environment.

FIG. 4 illustrates one embodiment of a process 400 for preserving the life of a power source of a wireless end node in a wireless communication system for use in a mobile environment, such as a transport refrigeration system. As shown in FIG. 2, a wireless communication system can include a network coordinator and a plurality of wireless end nodes. Also, as shown in FIG. 3, a wireless end node can include a power source connected to an electrical assembly having a controller with a sleep timer, an operation sensor, a transceiver, a memory storage that stores a missed acknowledgement counter, and an LED light.

The flowchart 400 begins at 405. At 410, where a wireless communication system (including a network coordinator and one or more wireless end nodes) for use in a transport refrigeration system of a reefer is deployed, paired, installed and set for normal operation. In order to preserve the life of the power source of the wireless node, under normal operation the wireless end node is periodically put in a sleep mode where the electrical assembly is powered down to reduce the amount of current drawn from the power source.

The wireless end node uses the sleep timer in the controller to set a time period that the wireless end node remains in the sleep mode. The time period of the sleep timer can be set by a user to a time limit that allows the network coordinator to provide accurate information regarding the status of the transport refrigeration system being monitored by the wireless end node while preventing excessive use of the power source that can drain lifespan of the wireless end node. In one embodiment, the time period of the sleep timer can be set to, for example, approximately five minutes.

At 415, the network coordinator of the wireless communication system becomes invisible to the wireless end node or the wireless end node becomes invisible to the wireless communication system. The network coordinator can become invisible to the wireless end node when, for example, the wireless environment has become inhospitable due to interference caused by nearby wireless devices (e.g., a wireless camera, microwave oven, a WiFi network on the same channel, etc.), power to the network coordinator has been removed or is too low for operation, or has been shutdown for service.

At 420, a wireless end node switches from the sleep mode to the normal operation mode. The wireless end node can switch from the sleep mode to the normal operation mode when the amount of time that the wireless end node is set to remain in the sleep mode has lapsed or an interrupt request from a user is received. The wireless end node then sends a wireless end node acknowledgement message to the network coordinator. As the network coordinator has become invisible to the wireless end node or the wireless end nodes have become invisible to the wireless end node, the wireless end node does not receive a network coordinator acknowledgment message from the network coordinator. Accordingly, the controller of the wireless end node determines that a missed radio frequency acknowledgement session has occurred at 425. At 430, the controller of the wireless end node increments a missed acknowledgement counter value stored in the memory of the wireless end node by one.

At 435, the controller of the wireless end node determines whether the missed acknowledgement counter value is equal to a missed acknowledgment threshold. The missed acknowledgment threshold can be any non-zero integer set by the user. In one embodiment, the missed acknowledgment threshold is set to three. If the missed acknowledgment counter value does not equal the missed acknowledgment threshold, the process 400 proceeds to 440. If the missed acknowledgement counter value does equal the missed acknowledgment threshold, the process 400 proceeds to 445.

At 440, the controller of the wireless end node resets the sleep timer and switches the wireless end node into a sleep mode. The process 400 then proceeds back to 420.

When the missed acknowledgement counter value does equal the missed acknowledgment threshold, the controller of the wireless end node adjusts the time period of the sleep timer to increase the amount of time that the wireless end node is in the sleep mode at 445. In some embodiments, the time period of the sleep timer can be increased to 30 minutes or more. In one embodiment, the time period of the sleep timer can be increased to, for example, two hours. By increasing the amount of time that the wireless end node is in the sleep mode, the life of the power source of the wireless end node can be increased. The process 400 then proceeds to 450.

At 450, the wireless end node resumes normal operation with the increased time period that the wireless end node remains in the sleep mode unless an interrupt request from a user is received. At 455, when the wireless end node switches to the normal operation mode, the controller of the wireless end node sends a wireless end node acknowledgement message to the network coordinator and waits for a network coordinator acknowledgement message from the network coordinator. When a network coordinator acknowledgment message is not received, indicating that the network coordinator is still invisible to the wireless end node, the process 400 returns to 450. When a network coordinator acknowledgment message is received, the process 400 proceeds to 460. At 460, the controller of the wireless end node clears the missed acknowledgement counter value stored in the memory of the wireless end node. The process 400 then returns to 410.

Aspects:

It is noted that any of aspects 1-6 below can be combined with any of aspects 7-12 and aspects 13-18. Also, any of aspects 7-12 can be combined with any of aspects 13-18.

1. A method for preserving the life of a power source of a wireless end node of a wireless communication system for use in a mobile environment comprising:
    wirelessly transmitting a wireless end node acknowledgment message to a network coordinator during a normal operation mode of the wireless end node;
    the wireless end node monitoring for a network coordinator acknowledgment message from a network coordinator in response to the wireless end node acknowledgement message during the normal operation mode of the wireless end node;
    incrementing a missed acknowledgment counter value stored in a memory storage of the wireless end node when the network coordinator acknowledgment message is not received; and
    increasing a time period of a sleep timer of the wireless end node from a first time period to a second time period when the missed acknowledgment counter value equals a missed acknowledgment threshold in order to reduce current being drawn from the power source of the wireless end node.

2. The method of aspect 1, further comprising:
    the wireless end node receiving a network coordinator acknowledgement message from the network coordinator; and
    clearing the missed acknowledgement counter and returning the time period of the sleep timer from the second time period to the first time period.

3. The method of aspects 1-2, further comprising:
    the wireless end node receiving an interrupt request from a user; and
    clearing the missed acknowledgement counter and returning the time period of the sleep timer from the second time period to the first time period.

4. The method of aspects 1-3, wherein the missed acknowledgement threshold is three.

5. The method of aspects 1-4, wherein the first time period is five minutes.

6. The method of aspects 1-5, wherein the second time period is two hours.

7. A wireless communication system for use in a mobile environment comprising:
    one or more wireless end nodes that is configured to monitor a property of a transport refrigeration system and transmit data transmissions to and receive data transmissions from the network coordinator, the one or more wireless end nodes configured to operate in a normal operation mode and a sleep mode; and
    a network coordinator that is configured to manage, command, direct and regulate the behavior of the one or more wireless end nodes;
    wherein, during the normal operation mode, the wireless node is configured to increment a missed acknowledgment counter value stored in a memory storage of the wireless end node when a network coordinator acknowledgment message is not received, and
    wherein, during the normal operation mode, the wireless end node is configured to increase a time period of a sleep timer of the wireless end node from a first time period to a second time period when the missed acknowledgment counter value equals a missed acknowledgment threshold in order to reduce current being drawn from a power source of the wireless end node.

8. The wireless communication system of aspect 7, wherein the wireless end node is configured to clear the missed acknowledgement counter and return the time period of the sleep timer from the second time period to the first time period when the wireless end node receives a network coordinator acknowledgement message from the network coordinator.

9. The wireless communication system of aspects 7-8, wherein the wireless end node is configured to clear the missed acknowledgement counter and return the time period of the sleep timer from the second time period to the first time period when the wireless end node receives an interrupt request from a user.

10. The wireless communication system of aspects 7-9, wherein the missed acknowledgement threshold is three.

11. The wireless communication system of aspects 7-10, wherein the first time period is five minutes.

12. The wireless communication system of aspects 7-11, wherein the second time period is two hours.

13. A wireless end node of a wireless communication system for use in a mobile environment comprising:
    a power source;
    a controller configured to manage, command, direct and regulate the behavior of the wireless end node and configured to switch operation of the wireless end node between a normal operation mode and a sleep mode, the controller including a sleep timer configured to count down a time period that the wireless end node operates in the sleep mode;
    an operating sensor configured to monitor a property of a transport refrigeration system;
    a transceiver configured to transmit data to and receive data from a network coordinator of a wireless communication system; and
    a memory storage storing a missed acknowledgment threshold and a missed acknowledgment counter value;
    wherein the controller increments a missed acknowledgment counter value stored in a memory storage of the wireless end node when the transceiver does not receive a network coordinator acknowledgment message in response to a transmitted wireless end node acknowledgement message, and
    wherein the controller is configured to increase the time period of the sleep timer from a first time period to a second time period when the missed acknowledgment counter value equals the missed acknowledgment threshold in order to reduce current being drawn from the power source.

14. The wireless end node of aspect 13, wherein the controller is configured to clear the missed acknowledgement counter and return the time period of the sleep timer from the second time period to the first time period when the transceiver receives a network coordinator acknowledgement message from the network coordinator.

15. The wireless end node of aspects 13-14, wherein the wireless end node is configured to clear the missed acknowledgement counter and return the time period of the sleep timer from the second time period to the first time period when the wireless end node receives an interrupt request from a user.

16. The wireless end node of aspects 13-15, wherein the missed acknowledgement threshold is three.

17. The wireless end node of aspects 13-16, wherein the first time period is five minutes.

18. The wireless end node of aspects 13-17, wherein the second time period is two hours.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A method for preserving the life of a power source of a wireless end node of a wireless communication system for use in a mobile environment, the wireless end node including an electrical assembly powered by a power source, the electrical assembly including an operation sensor configured to sense an operation of a transport refrigeration system, a transceiver configured to transmit a data signal to and receive a data signal from the network coordinator, a memory storage, a sleep timer configured to count down a time period that the wireless end node operates in a sleep mode, and a controller including the sleep timer, the controller being connected to the operation sensor, the transceiver and the memory storage, and the controller configured to manage, command, direct and regulate behavior of the wireless end node and configured to operate the wireless end node in a normal operation mode and the sleep mode, the method comprising:

deploying, installing, pairing and setting the wireless end node in the normal operation mode, wherein in the normal operation mode the electrical assembly drawing current from the power source, the operating sensor monitoring a portion of the transport refrigeration system and the transceiver transmitting data to and receiving data from the network coordinator;

the wireless end node wirelessly transmitting a wireless end node acknowledgment message to a network coordinator during a normal operation mode of the wireless end node;

the wireless end node monitoring for a network coordinator acknowledgment message from a network coordinator in response to the wireless end node acknowledgement message during the normal operation mode of the wireless end node;

incrementing a missed acknowledgment counter value stored in a memory storage of the wireless end node when the network coordinator acknowledgment message is not received;

switching from the normal operation mode to the sleep mode for a first time period after incrementing the missed acknowledgement counter value or after the wireless end node receiving the network acknowledgement message from the network coordinator, wherein in the sleep mode the electrical assembly powering down and reducing the amount of current drawn from the power source to a level sufficient for operating the sleep timer, for receiving an interrupt request via the transceiver, and for powering up the electrical assembly from the sleep mode back to the normal operation mode; and increasing a time period of the sleep timer of the wireless end node from the first time period to a second time period when the missed acknowledgment counter value equals a missed acknowledgment threshold in order to reduce current being drawn from the power source of the wireless end node;

the wireless end node receiving a network coordinator acknowledgement message from the network coordinator during the normal operation mode;

clearing the missed acknowledgement counter and returning the time period of the sleep timer from the second time period to the first time period when the wireless end node receives the network coordinator acknowledgement message from the network coordinator;

the wireless end node receiving the interrupt request from a user; and clearing the missed acknowledgement counter and returning the time period of the sleep timer from the second time period to the first time period when the wireless end node receives the interrupt request from the user.

2. The method of claim 1, wherein the missed acknowledgement threshold is three.

3. The method of claim 1, wherein the first time period is five minutes.

4. The method of claim 1, wherein the second time period is two hours.

5. A wireless communication system for use in a mobile environment comprising:

one or more wireless end nodes that is configured to monitor a property of a transport refrigeration system and transmit data transmissions to and receive data transmissions from the network coordinator, the one or more wireless end nodes configured to operate in a normal operation mode and a sleep mode; and a network coordinator that is configured to manage, command, direct and regulate the behavior of the one or more wireless end nodes;

wherein, during the normal operation mode, the wireless node is configured to increment a missed acknowledgment counter value stored in a memory storage of the wireless end node when a network coordinator acknowledgment message is not received, wherein the wireless end node is configured to switch from the normal operation mode to the sleep mode for a first time period after the missed acknowledgement counter value is incremented or after the wireless end node receives the network acknowledgement message from the network coordinator, wherein, during the normal operation mode, the wireless end node is configured to increase a time period of a sleep timer of the wireless end node from the first time period to a second time period when the missed acknowledgment counter value equals a missed acknowledgment threshold in order to reduce current being drawn from a power source of the wireless end node, wherein each of the one or more wireless end nodes includes an electrical assembly powered by the power source, the electrical assembly including an operation sensor configured to sense an operation of a transport refrigeration system, a transceiver configured to transmit a data signal to and receive a data signal from the network coordinator, a memory storage, a sleep timer configured to count down a time period that the wireless end node operates in the sleep mode, and a controller including the sleep timer, the controller connected to the operation sensor, the transceiver and the memory storage, and the controller configured to manage, command, direct and regulate behavior of the wireless end node and configured to operate the wireless end node in the normal operation mode and the sleep mode, wherein in the normal operation mode the electrical assembly is configured to draw current from the power source, the operating sensor is configured to monitor a portion of the transport refrigeration system and the transceiver is configured to transmit data to and receive data from the network coordinator, wherein the wireless end node is configured to clear the missed acknowledgement counter and return the time period of the sleep timer from the second time period to the first time period when the wireless end node receives a network coordinator acknowledgement message from the network coordinator, and wherein the wireless end node is configured to clear the missed acknowledgement counter and return the time period of the sleep timer from the second time period to the first time period when the wireless end node receives an interrupt request from a user.

6. The wireless communication system of claim 5, wherein the missed acknowledgement threshold is three.

7. The wireless communication system of claim 5, wherein the first time period is five minutes.

8. The wireless communication system of claim 5, wherein the second time period is two hours.

9. A wireless end node of a wireless communication system for use in a mobile environment comprising:
  a power source;
  an electrical assembly including:
    a controller configured to manage, command, direct and regulate the behavior of the wireless end node and configured to switch operation of the wireless end node between a normal operation mode and a sleep mode, the controller including a sleep timer configured to count down a time period that the wireless end node operates in the sleep mode;
    an operating sensor configured to monitor a property of a transport refrigeration system;
    a transceiver configured to transmit data to and receive data from a network coordinator of a wireless communication system; and
    a memory storage storing a missed acknowledgment threshold and a missed acknowledgment counter value;

wherein in the normal operation mode the electrical assembly is configured to draw current from the power source, the operating sensor is configured to monitor a portion of the transport refrigeration system and the transceiver configured to transmit data to and receive data from the network coordinator, wherein in the sleep mode the electrical assembly is configured to power down and reduce the amount of current drawn from the power source to a level sufficient for operating the sleep timer, for receiving an interrupt request via the transceiver, and for powering up the electrical assembly from the sleep mode back to the normal operation mode, wherein, during the normal operation mode, the controller is configured to wait for a network coordinator acknowledgement message from the network coordinator;

wherein the controller is configured to increment a missed acknowledgment counter value stored in a memory storage of the wireless end node when the transceiver does not receive the network coordinator acknowledgment message in response to a transmitted wireless end node acknowledgement message, and wherein the controller is configured to increase the time period of the sleep timer from a first time period to a second time period when the missed acknowledgment counter value equals the missed acknowledgment threshold in order to reduce current being drawn from the power source, wherein the controller is configured to switch from the normal operation mode to the sleep mode for a first time period after incrementing the missed acknowledgement counter value or after the wireless end node receiving the network acknowledgement message from the network coordinator, wherein the controller is configured to clear the missed acknowledgement counter and return the time period of the sleep timer from the second time period to the first time period when the transceiver receives a network coordinator acknowledgement message from the network coordinator, and wherein the wireless end node is configured to clear the missed acknowledgement counter and return the time period of the sleep timer from the second time period to the first time period when the wireless end node receives an interrupt request from a user.

10. The wireless end node of claim 9, wherein the missed acknowledgement threshold is three.

11. The wireless end node of claim 9, wherein the first time period is five minutes.

12. The wireless end node of claim 9, wherein the second time period is two hours.

\* \* \* \* \*